United States Patent

[11] 3,551,650

[72] Inventor Hans Kubach
Viernheim, Germany
[21] Appl. No. 580,938
[22] Filed Sept. 21, 1966
[45] Patented Dec. 29, 1970
[73] Assignee Brown, Boveri & Cie Aktiengesellschaft
Kallstadterstr
Mannheim-Kafertal, Germany
a corporation of Germany
[32] Priority Sept. 28, 1965
[33] Germany
[31] No. B83914

[54] BIQUINARY COUNTER FOR DIGITAL INDICATORS
3 Claims, 2 Drawing Figs.

[52] U.S. Cl. .......... 235/92, 340/347
[51] Int. Cl. .......... H03k 21/08, H03k 23/08; G06f 5/00
[50] Field of Search .......... 235/92(95), (65); 340/324, 347(A—D)

[56] References Cited
UNITED STATES PATENTS

| | | | |
|---|---|---|---|
| 2,881,418 | 4/1959 | Stephens et al. | 340/347 |
| 2,943,237 | 6/1960 | Bell | 315/84.6 |
| 2,731,631 | 1/1956 | Spaulding | 340/318 |
| 2,993,202 | 7/1961 | Halonen | 328/26 |
| 3,012,199 | 12/1961 | Dorczak et al. | 328/26 |
| 3,019,426 | 1/1962 | Gilbert | 340/347 |
| 3,023,371 | 2/1962 | Balish et al. | 331/38 |
| 3,059,237 | 10/1962 | Kolb | 346/14 |
| 3,119,950 | 1/1964 | Somlyody I | 315/84.6 |
| 3,335,266 | 8/1967 | Somlyody II | 235/92 |
| 3,372,265 | 3/1968 | Gordon et al. | 235/92 |

OTHER REFERENCES

E. Schurig "Neue Zaehldekaden fuer Digitale Mebgeraete Nach Dem Biquinaeren Prinzip" Elektronik 1962 No. 5 pp. 135— 138

*Primary Examiner*—Maynard R. Wilbur
*Assistant Examiner*—Joseph M. Thesz, Jr.
*Attorney*—Isidore Match

ABSTRACT: A counter includes a binary input section and a quinary output section to provide a biquinary counter, the binary section including a pair of active devices and the quinary section including five stages each including an active device, each of the stages representing a chosen unit numerical quantity, each of the active devices having an output resistance with a respective conductivity corresponding to the quantity represented by its active device, means for connecting the resistances in chosen additive relationships to provide a current therethrough having a value which is an analog representation of the numerical contents of the counter, and a plurality of diodes connected in circuit with corresponding ones of the active devices and the output resistances for decoupling the currents in the resistances from each other, one of the active devices in the binary section and three of the active devices in the quinary section including an output decoupling diode and output resistance, the resistances being chosen to have respective conductivities weighted in the ratio of 1:2:4:6, a fourth of the active devices in the quinary section being connected to the output resistances weighted 2 and 6 through other corresponding decoupling diodes.

BIQUINARY COUNTER FOR DIGITAL INDICATORS

Figure 1:
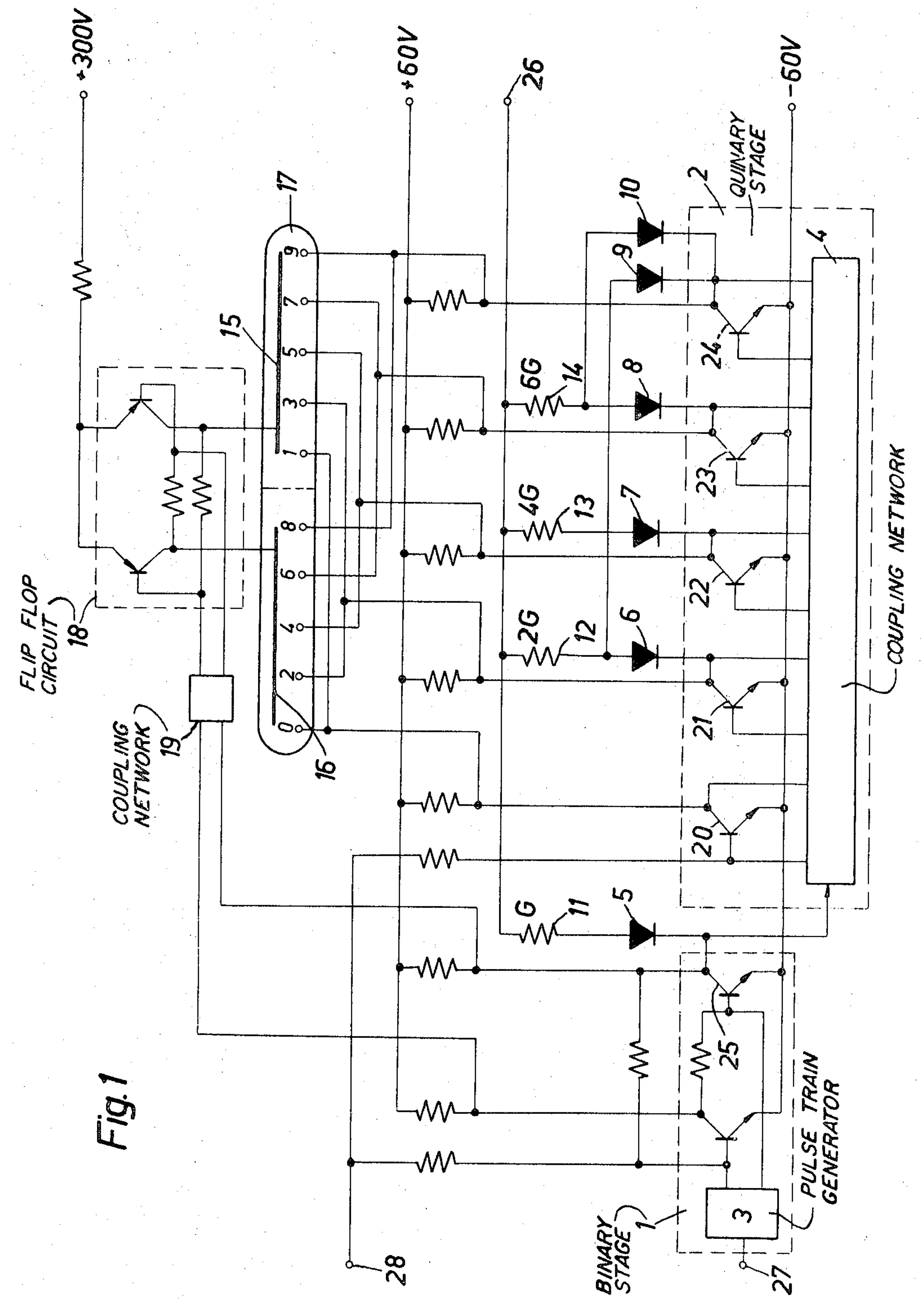

My invention relates to counters. More particularly, it relates to improved counters of the biquinary type.

As is well known, biquinary type counters are employed to provide decade counts of pulses. Such counters may comprise a series connected input flip-flop stage and a quinary arrangement connected at the output, the quinary stage suitably being constructed as a five-stage ring counter. If the result of a counting is to be displayed, the counter may be arranged to control the number representing cathodes of a glow lamp particularly constructed for such display purposes. To differentiate between even and odd numbers, an additional flip-flop may be provided. In this latter arrangement, the glow lamp for displaying the contents of the counter may comprise five cathodes having an anode in common, voltage being applied to the anode by the additional flip-flop in accordance with whether an odd or even number is to be indicated.

It is also well-known to employ such biquinary counters to indicate in digital form, a measured quantity which is obtained in an analogue form. To this end, there has to be provided from the counter, an analogue comparison signal which corresponds to the state of the counter. To obtain such analogue signal, there have been employed separate circuits comprising precision resistances whose individual currents flowing respectively therethrough have magnitudes corresponding respectively to the value of the numerical values. As is readily appreciated, the control of such separate circuits require additional circuit components such as active devices, coupling networks, etc. Obviously, the need for these additional components, devices and networks entail a concomitantly additional and undesirable expense.

Accordingly, it is an important object of this invention to provide an electronic counter of the biquinary type which produces an analogue signal indicative of the state of the counter which is simpler and less expensive than known counters employed for a like purpose.

This object is achieved by providing a biquinary counter in which the active devices contained in the quinary portion thereof, function to serve both as active components of the counter and for controlling currents through evaluating resistors whose sums in various combinations analogously correspondingly represent the state of the counter.

The necessary decoupling of the evaluating currents respectively from each other is effected, according to the invention, by means of semiconductor diodes which may either be connected in series with the evaluating resistors or may convert the output electrodes of the active devices such as the collectors of transistors respectively to a reference potential source. Preferably, and in accordance with the invention, the evaluation of an odd number is effected by the sum of the number "1" and the number which is one less than the particular odd number to be evaluated and the evaluation of the number "8" is provided by the summing of the evaluations of the numbers "2" and "6."

Generally speaking and in accordance with the invention, there is provided a counter comprising a plurality of stages, each of the stages comprising an active device, each of the stages representing a chosen unit numerical quantity. Each of the active devices is provided with an output resistance having a respective conductivity corresponding to the quantity represented by its active device. Means are included for connecting the resistances in chosen additive relationships to provide a current therethrough having a value which is an analogue representation of the numerical contents of the counter.

The foregoing and more specific objects and features of my invention will be apparent from, and will be mentioned in, the following description of a biquinary counter according to the invention shown by way of example in the accompanying drawing.

Figure 2:
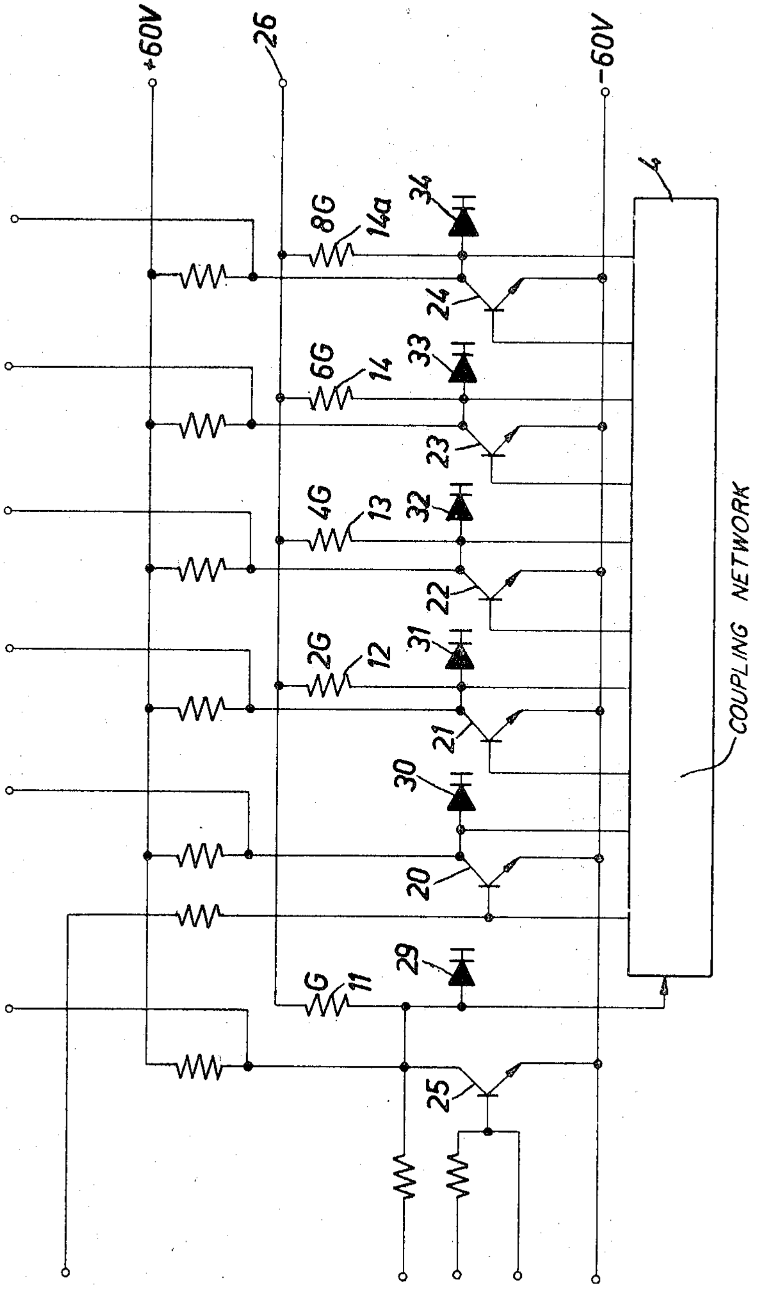

In the drawing, FIG. 1 is a diagram of an illustrative embodiment of a biquinary counter constructed according to the invention; and FIG. 2 is a diagram of a modification suitable for use in the counter shown in FIG. 1.

Referring now to FIG. 1, the biquinary counter shown therein comprises a binary stepdown stage 1 followed by a quinary arrangement 2. To the input 27 of stage 3 there is applied a pulse train. Stage 3 may suitably be a circuit for producing a pair of like pulse trains 180° displaced in phase with respect to each other. The two transistors in stage 1, the output transistor thereof being transistor 25 are mutually feedback connected, i.e. collector to base through a pair of resistors to provide a binary switching or flip-flop circuit, the flip-flop being switched in its transistor 25 output state upon the appearance of each alternately succeeding pulse at input 27. Stage 4 comprises a coupling network for stepping the quinary arrangement and may suitably be a shift register which receives as its input, the output from transistor 25.

The quinary arrangement comprises transistors 20, 21, 22, 23 and 24, each of these transistors being of the NPN type whereby their respective emitters are directly connected to a negative, i.e. minus 60 volts potential source and their respective collectors are each connected through an associated collector resistor to a plus 60 volts potential source. The bases of each of transistors 20 to 24 are all respectively connected to corresponding stages in network 4. Coupling network 4 is suitably designed such that only one of transistors 20 to 24 is conductive at any one given time and that the next pulse input to network 4 from transistor 25 causes the conductive one of transistors 20 to 24 to be rendered nonconductive and the succeeding transistor of transistors 20 to 24 to be rendered conductive. It is to be realized that within the contemplation of the invention, network 4 may be designed such that counting can be effected both in the forward and in the reverse directions.

In accordance with the invention, transistors 20 to 24, in addition to being the active devices in the counter, also operate to control the glow lamp-indicator tube 17 to achieve a considerable economy in the use of circuit components. To this end, for example, if it is assumed that transistor 22, for example, is conductive, a voltage of almost minus 60 volts is applied to the cathodes of tube 17 for the numbers 4 and 5 therein respectively. Since at this time transistors 20, 21, 23 and 24 are nonconductive, their respective collector voltages are virtually at plus 60 volts. The cathodes of tube 17 which are connected to the collectors of transistors 20, 21, 23 and 24 are also virtually at plus 60 volts.

Tube 17 comprises a pair of anodes 15 and 16 which are each connected to a plus 300 volt source through the opposite sides respectively of a flip-flop circuit 18. In the example given where transistor 22 is conductive, whether number 4 or number 5 glows depends upon which of the transistors of flip-flop 18 is conductive. Flip-flop 18 is connected with the flip-flop in stage 1 through a suitable coupling network 19, and operates in synchronism therewith.

In accordance with the invention, transistors 21, 22, 23, 24 and 25 are also operative to control currents to provide an analogue signal representative of the state of the counter. In this connection, network 3 can be designed whereby transistor 25 is rendered conductive at the first pulse appearing at input 27 and thereafter at every odd numbered pulse arriving at input 27. With transistor 25 conductive, a reference potential of almost minus 60 volts is applied to a resistor 11 having a conductivity value G through a diode 5. If in transistors 20 to 25, transistor 21 is conductive, number 2 of tube 17 glows and the resistor 12 having the conductivity value 2G is connected to the minus reference potential. At the switching of the counter to the next step, transistors 21 and 25 are both conductive and the sum of the conductivity values of resistors 11 and 12 is effected, and number 3 in tube 17 is caused to glow. The analogue output appears at terminal 26. The other resistors such as resistors 13 and 14 at this time do not provide any current to terminal 26 since their associated diodes function as blocking devices.

The producing of the analogue value representative of the quantity "8" is achieved by the arrangement associated with transistor 24 which is conductive when the counter is at a value of 8. Transistor 24 connects resistors 12 and 14 having conductivity values 2G and 6G through diodes 9 and 10. With this arrangement, there is eliminated the need for a precision resistance having a conductivity value of 8G. In a like manner, the analogue representation of the quantity "9" is effected by correspondingly connecting resistors 11, 12, and 14 which in total provides a conductivity value of 9G.

The arrangement shown in FIG. 1 comprising decoupling diodes 5, 6, 7, 8, 9 and 10 may efficaciously be employed if the currents which flow through the evaluating resistors G, 2G, 4G and 6G are relatively large as compared to the blocking currents of decoupling diodes 5 to 10. Such is generally the case for higher significant digit decades such as a hundred or thousand decades. In the lower digit decades such as the unit and ten decades, the evaluating currents may have magnitudes quite close to that of the diode blocking currents. To provide proper operation for such lower order decades, there is provided, according to the invention, the arrangement shown in FIG. 2 in which those structures corresponding to like structures in the arrangement shown in FIG. 1, bear the same designating numerals.

In FIG. 2, diodes 29, 30, 31, 32, 33 and 34 are provided in the collector circuits of transistors 25, 20, 21, 22, 23 and 24 respectively, the anodes of the diodes being connected to the collectors, the cathodes thereof being connected to ground. The diodes function to positively clamp the collectors to ground and insure that their collectors become no more positive than that permitted by the leakage voltage of the diodes. The leakage voltage may cause a slight error but it is of little or no consequence, since the evaluation currents have to be quite small, i.e., have little influence on the value of the analogue signal. The leakage voltage error probably is effectively nonexistent on the evaluating resistor having the conductivity value 8G. In any event, in the lower order digit decades, the elimination of the leakage voltage is not particularly essential since the resistors in this case may be of the less expensive type and have little need for precision.

It will be obvious to those skilled in the art upon studying this disclosure that counters according to my invention permit of a great variety of modifications and hence can be given embodiments other than those particularly illustrated and described herein without departing from the essential features of my invention and within the scope of the claims annexed hereto.

I claim:

1. A counter comprising a binary input section and a quinary output section to provide a biquinary counter, said binary section comprising a pair of active devices and said quinary section comprising five stages each comprising an active device, each of said stages representing a chosen unit numerical quantity, each of said active devices having an output resistance with a respective conductivity corresponding to the quantity represented by its active device, means for connecting said resistances in chosen additive relationships to provide a current therethrough having a value which is an analogue representation of the numerical contents of the counter, and a plurality of diodes connected in circuit with corresponding ones of said active devices and said output resistances for decoupling the currents in said resistances from each other, one of the active devices in said binary section and three of the active devices in said quinary section comprising an output decoupling diode and output resistance, said resistances being chosen to have respective conductivities weighted in the ratio of 1 : 2 : 4 : 6, a fourth of the active devices in said quinary section being connected to the output resistances weighted 2 and 6 through other corresponding decoupling diodes.

2. A counter as claimed in claim 1 wherein the analogue representation of a given odd number quantity is provided by the connection in additive relationship of the resistance having the conductivity weighted 1 and the resistance having the conductivity weighting which is the next lowest even number with respect to said given odd number.

3. A counter as claimed in claim 2 wherein, said analogue representation of the quantity 8 is provided by the connection in additive relationship of the resistances having conductivities weighted 2 and 6 respectively.